Patented Apr. 14, 1953

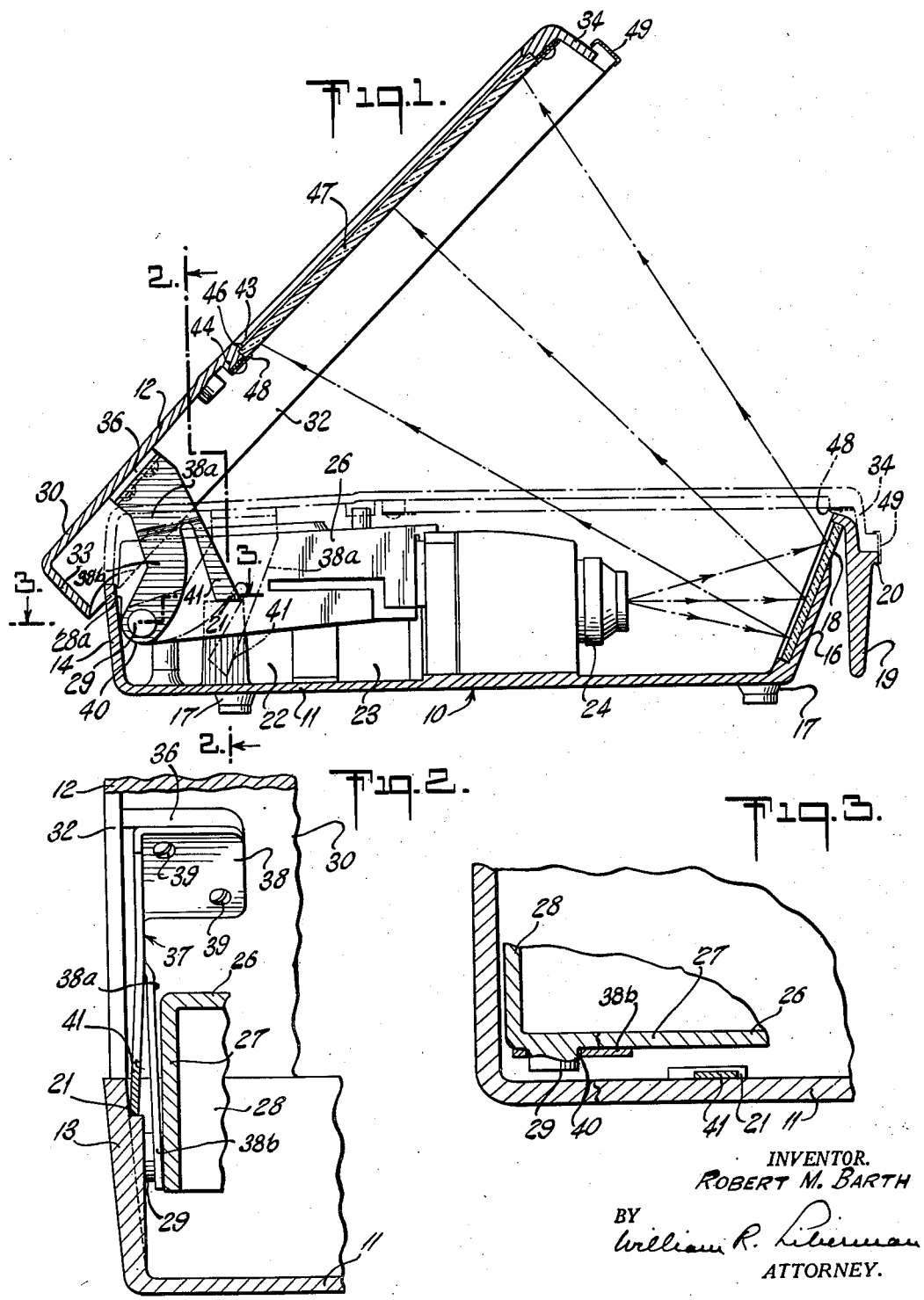

2,634,652

UNITED STATES PATENT OFFICE 2,634,652

PORTABLE FILM PROJECTING AND VIEWING APPARATUS

Robert M. Barth, Pelham Manor, N. Y., assignor to The FR Corporation, New York, N. Y., a corporation of New York Application December 5, 1950, Serial No. 199,249

8 Claims. (Cl. 88—24)

The present invention relates generally to film projection apparatus, and specifically it relates to film projection apparatus of the portable type having a self-contained viewing screen.

In the viewing of slide-mounted photographic films such as produced from thirty-five millimeter film and having dimensions of approximately one by one and one-half inches in a slide carrier measuring two by two inches, the image is either projected upon the conventional beaded or silvered screen or upon a translucent screen, as ground glass or the like. Self-contained units have been attempted in the past which include various forms of screen and projector mechanism, but these have been large, heavy and awkward, of complex character, expensive to fabricate, and deficient in operation. As a consequence, there is now available no small, light, easily portable or collapsible type of self-contained translucent screen and projector combination.

It is, therefore, an object of the present invention to provide an improved projection apparatus which is light, compact and easily portable, including the screen as a self-contained component.

A further object of the present invention is the provision of an improved portable self-contained screen and projector apparatus disposable within a casing forming part of the apparatus, and having a cover attached thereto by a novel and improved hinge construction.

Other and further objects of the present invention will in part be obvious from a reading of the following description read in conjunction with the accompanying drawings and others will be specifically pointed out hereinafter.

In the drawings annexed hereto, forming a part hereof,

Figure 1 is a side elevational view partly in section, illustrating an embodiment of the improved projection apparatus constructed in accordance with the present invention, in open operative position, and by broken line in closed portable position;

Figure 2 is a sectional view along line 2—2 in Figure 1; and

Figure 3 is a sectional view along line 3—3 in Figure 1.

The present invention contemplates the provision of a relatively small, easily portable casing including a base member and a cover member hinged relative to the base member, and provided with means which cooperate with the base member to support the cover member in a predetermined open position. The cover member has a rectangular opening within which a translucent screen is mounted and suitably supported on the cover. A slide projector including an illuminating system, a light condensing system and an optical projection system is mounted in the base member and is directed to project the light rearwardly. The rays of light from the projector are directed against a mirror mounted at a suitable angle upon the rear wall of the base member and are deflected onto the translucent screen, where the enlarged image of the picture appearing on a slide inserted in the projector falls, and may be viewed from the front of the projector apparatus. The projection apparatus is constructed to be simply operated, rugged, inexpensive and fool-proof. The hinge construction permitting the opening of the screen supporting cover to operative position is another novel feature of the present invention, and includes a pair of arms depending from the cover and having circular apertures at their lower ends which engage studs or pins extending laterally from the projector housing. Furthermore, these arms have rearwardly projecting portions in the nature of supplementary arms which are laterally sprung and fall into position resting upon a pair of corresponding shoulders formed on the inner face of the base side walls when the cover is brought into open viewing position. In order to permit closing of the casing cover, these projections need only be urged inwardly.

Referring now to the drawings, a portable casing according to the present invention is designated by the numeral 10 and consists of a base member 11 and a cover member 12 hinged relative to the base member 11 in a manner which will be hereinafter more fully described. The base member 11 includes a bottom portion and outwardly sloping side walls 13, front wall 14 and a more sharply outwardly sloping rear wall 16, the bottom being provided with suitable depending legs 17, 17. A rectangular mirror 18 is mounted on the inner face of the rear wall 16 and is positioned to reflect or direct an image forwardly as will be set forth below. Furthermore, a suitable handle 19 is mounted in the wall 16 and is provided with a projecting portion 20 defining a catch engaging shoulder. Moreover, a pair of oppositely disposed shoulders or ledges 21 are formed on the inner faces of the side walls 13 spaced a short distance from the front wall 14, which shoulders cooperate with the cover hinge mechanism to support the cover into the desired open position. It should be noted that the casing 10 including the base member 11 and the cover 12 may be made of any suitable material such as a plastic or the like.

The projector, per se, is mounted in the base member 11 of the casing 10 and includes a source of light or illuminating portion indicated generally by reference numeral 22, a light condensing portion indicated generally by reference numeral 23, and an image projecting lens system indicated generally by reference numeral 24 separated from the condensing system by a slide receiving passageway. The specific structures of the illuminating portion 22, condensing portion 23 and lens system 24 are not shown in detail, but in the device of the present invention they are arranged longitudinally along the base member 11 and directed to project the light rays toward the mirror 18. The illuminating portion 22 of the projector includes a housing having an upper portion consisting of a shell 26 having a cover wall provided with ventilating louvres or the like, and having depending side walls 27 and a rear wall 28 having an outwardly projecting flange 28a which abuts the inner face of the front wall 14 of the base 11. Extending outwardly from the side walls 27 adjacent the lower rear corners thereof are the oppositely disposed cylindrical projections or pins 29 whose outer faces are slightly spaced from the inner faces of the side walls 13, as seen in Figures 2 and 3.

The lid or cover member 12 includes a top 30, depending side walls 32 and front and rear walls 33 and 34 respectively. The under face of the top wall 30 is provided with a pair of depending platform portions 36, 36 of rectangular shape, spaced rearwardly of the front wall 33, and adjacent the side walls 32, see Figures 1 and 2. A pair of hinge members 37 are provided, and mounted on the platforms 36, each hinge including a laterally extending flange 38 abutting the platform 36 and secured thereto by screws 39, 39 or other suitable means. Depending from the flange 38 is an arm 38a which is angularly shaped, having an upper portion substantially normal to the flange 38 and a forwardly extending lower portion 38b which reaches a point rearwardly of the front wall 33, and which has a circular opening 40 formed therein adjacent the unsupported extremity thereof. Arm portion 38b is normally sprung inwardly towards shell 26. The opening 40 in each portion 38b receives and rotatably engages the corresponding cylindrical projection 29 extending laterally from shell wall 27. Furthermore, each of the arms 38a is provided with a supplementary arm 41 spaced rearwardly thereof and formed integrally therewith. Moreover, the lower edges of the arms 41 are lower than the opening 40 relative to the cover 12 and in substantial vertical alignment with the flange 38 when the cover 12 is in closed position. The arms 41 are formed preferably of resilient material and are sprung outwardly towards the side walls 13 of the base portion 11. It will be noted that arms 38a and 41 are sprung in opposite directions.

The top wall 30 of the cover 12 has a large rectangular opening 43 formed therein adjacent the rear edge thereof. A peripheral upstanding rim 44 surrounds the opening 43 and is spaced therefrom by a ledge or shoulder 46. A translucent screen 47, rectangular in shape and formed of ground glass, plastic or other suitable material, nests within the rim 44 and abuts against the ledge 46, being retained in place by a frame member 48 secured to the rim 44 by rivets or the like and having its inner edge abutting and overhanging the translucent screen 47. A catch member 49 is disposed on the lower edge of the rear wall 34 and engages the projection 20 when the cover 12 is closed, thereby to maintain the cover in closed position.

Considering now the operation of the projection apparatus as above described, the casing cover 12 is shown in closed position in Figure 1 by the broken lines. In the closed position, the edges of the walls of the base portion 11 and the cover 12 abut each other, completely enclosing the projector per se. By releasing catch member 49 from engagement with projection 20, cover 12 may be swung into the open position shown in Figure 1 in solid lines. The supplementary arms 41 thus swing about the axes of the cylindrical projections or pins 40 and, due to their normal biasing, spring outwardly upon passing the shoulders 21. The cover 21 is maintained in the position illustrated in the drawing by allowing the weight of the cover to rest upon the shoulders 21, engaged by the lower edges of arms 41. In the aforementioned open position, the center of the translucent screen coincides with the center ray of the projector as reflected by the mirror 18 and normal to this ray. Furthermore, the lens system is adjustable to focus the projected image upon the translucent screen 47 by way of the mirror 18 and is of such focal length so that the projected image size is substantially that of the screen 47. In order to close the casing, the supplementary arms 41 are pressed inwardly, against their normal biasing, until the lower edges thereof are released from engagement with the shoulders 21, as shown by the broken line in Figure 3, and the cover 12 is allowed to swing into closed position, with catch member 49 brought into engagement with the projection 20 to lock the cover to the base.

As will be obvious from the foregoing, cover 21 may be opened to a 90° position with respect to the base 11, to permit access to the lens, lighting and projector systems. Further, and as desired, cover 21 may be removed by pressing arms 38a outwardly and clear of pins 40.

While there has been described and illustrated herein a preferred embodiment of the present invention, it is apparent that numerous omissions and alterations may be made without departing from the spirit thereof.

I claim:

1. A film projection apparatus of the character described comprising a light, easily portable casing including a base member and a cover member hinged thereto, said base member having a bottom wall, side walls and front and rear walls, said cover member having a top wall and depending side walls and front and back walls, an outwardly and upwardly sloping mirror mounted on the inner face of said rear wall of the base member, means for retaining said cover member in a predetermined open position relative to said base member, the top wall of said cover member having a rectangular opening formed therein, a translucent screen immovably mounted on said top wall in the plane thereof and superimposed upon said opening, and a projector including an illumination source and a picture projecting lens system disposed longitudinally in said base member and directed toward said mirror, whereby to project an image upon said translucent screen in the cover when said cover is in open position the hinge point being located at the end of the casing opposite the mirror.

2. A film projection apparatus of the character described comprising a light, easily portable casing including a base member having a bottom wall, side walls and front and rear walls, a cover member having a top wall, depending side walls and front and rear walls, a pair of oppositely disposed arms depending from the top wall of said cover member adjacent the side walls and spaced rearwardly of the front wall thereof, said arms having circular openings formed adjacent the ends thereof, a pair of oppositely disposed laterally extending pins disposed within said base member rearwardly of the front wall thereof and adjacent the side walls and engaging the openings formed in said arms to permit said cover to pivot between an open and closed position, an upwardly and outwardly sloping mirror mounted on the inner face of the rear wall of said base member, said cover member having a rectangular opening formed therein, a translucent screen immovably mounted on said cover member in the plane of the top wall thereof and superimposed upon said opening, and a projector including an illumination source and a picture projecting lens system disposed longitudinally in said base member and directed toward said mirror, whereby to project an image upon said translucent screen in the top wall of the cover when said cover is in open position the pivoting point being located at the end of the casing opposite the mirror.

3. A film projection apparatus as in claim 2, wherein there is provided a supplementary resilient arm affixed to each of said depending arms and spaced rearwardly thereof, said supplementary arms being normally sprung outwardly, and the side walls of the base member are provided with ledge portions adjacent the upper edges thereof which engage the lower edges of said supplementary arms when said cover member is in open position to releasably support and retain said cover member in said open position.

4. A film projection apparatus of the character described comprising a light, easily portable casing including a base member having a bottom wall and side walls and front and rear walls and a cover member having a top wall, side walls and front and rear walls, a pair of oppositely disposed arms depending from the top wall of said cover member adjacent the side walls and spaced rearwardly of the front wall thereof, said arms having circular openings formed adjacent the ends thereof, an outwardly and upwardly sloping mirror mounted on the inner face of the rear wall of said base member, a projector disposed in said base member and including a lamp housing having side walls and a picture projecting lens system directed longitudinally toward said mirror, said lamp housing having side walls spaced from the side walls of said base member and having an oppositely disposed pair of laterally extending pins positioned on the outer face thereof and engaging said openings formed in said arms to permit said cover member to pivot between an open and closed position, the top wall of said cover member having a rectangular opening formed therein and a translucent screen immovably mounted on said cover member in the plane of the top wall thereof and superimposed upon said opening the pivoting point being located at the end of the casing remote from the mirror.

5. A film projection apparatus as claimed in claim 4, wherein there is provided a supplementary resilient arm affixed to each of said depending arms and spaced rearwardly thereof, said supplementary arms being normally sprung outwardly, and the side walls of the base member are provided with ledge portions adjacent the upper edges thereof which engage the lower edges of said supplementary arms when said cover member is in open position to releasably support and retain said cover member in said open position.

6. A film projection apparatus as claimed in claim 4, wherein said depending arms are angularly shaped having their lower portions extending forwardly relative to said cover member.

7. A film projection apparatus as in claim 4, wherein the depending arms are of resilient material and sprung inwardly towards each other, and there is provided a supplementary resilient arm affixed to each depending arm and spaced rearwardly thereof, said supplementary arms being sprung outwardly from the main depending arm.

8. In a film projection apparatus of the character described, a recessed casing having a floor, side walls and front and rear walls, inwardly directed ledges on the casing side walls, a screen-holding cover for the casing, and means to pivotally connect the cover and casing, a projector housing within the casing spaced from the side walls thereof, said housing having side walls and an oppositely disposed pair of laterally and outwardly extending pins positioned on the said side walls of the casing, a pair of hinge plates permanently fixed to the underside of the cover, each hinge having a downwardly extending component apertured to receive therewithin a pin, each hinge also having a second downwardly extending resilient component spaced rearwardly and outwardly of the first component, said second component springing into alignment with the ledges on pivotal movement of the cover away from the casing and resting atop the ledges when the cover is swung towards the casing, whereby to hold the cover in an angular position relative to the casing.

ROBERT M. BARTH.

References Cited in the file of this patent

UNITED STATES PATENTS

| Number | Name | Date |
|---|---|---|
| 1,766,197 | Shepard | June 24, 1930 |
| 2,299,657 | Rystedt | Oct. 20, 1942 |
| 2,361,398 | Harris | Oct. 31, 1944 |